US009188216B2

(12) United States Patent
Nikolaizig

(10) Patent No.: US 9,188,216 B2
(45) Date of Patent: Nov. 17, 2015

(54) METHOD AND DEVICE FOR THE INTERNAL OILING OF A GEAR SHAFT THAT IS ARRANGED COAXIALLY TO THE OIL PUMP OF A GEARBOX AND DRIVES THE OIL PUMP

(75) Inventor: Christian Nikolaizig, Werber/Havel (DE)

(73) Assignee: ZF Friedrichshafen AG, Friedrichshafen (DE)

(*) Notice: Subject to any disclaimer, the term of this patent is extended or adjusted under 35 U.S.C. 154(b) by 227 days.

(21) Appl. No.: 13/700,165

(22) PCT Filed: Apr. 4, 2011

(86) PCT No.: PCT/EP2011/055163
§ 371 (c)(1),
(2), (4) Date: Nov. 27, 2012

(87) PCT Pub. No.: WO2011/147615
PCT Pub. Date: Dec. 1, 2011

(65) Prior Publication Data
US 2013/0233650 A1    Sep. 12, 2013

(30) Foreign Application Priority Data

May 28, 2010    (DE) .......................... 10 2010 021 894

(51) Int. Cl.
*F01M 1/00*    (2006.01)
*F01M 11/00*    (2006.01)
(Continued)

(52) U.S. Cl.
CPC ............. *F16H 57/0436* (2013.01); *F01M 1/02* (2013.01); *F01M 11/02* (2013.01); *F16H 57/043* (2013.01); *F16H 57/0441* (2013.01); *F16H 57/0494* (2013.01)

(58) Field of Classification Search
CPC ......... F01M 1/02; F01M 9/108; F01M 11/02; F01M 2011/026; F16H 57/0436; F16H 57/0497
USPC ......... 184/26, 6.28, 65; 464/7; 474/43, 45, 91
See application file for complete search history.

(56) References Cited

U.S. PATENT DOCUMENTS 3,065,822 A * 11/1962 McAfee ................ B60R 17/00
                                                      184/11.1
3,618,710 A * 11/1971 DeLisse et al. ............. 184/6.11
(Continued)

FOREIGN PATENT DOCUMENTS

DE    39 05 770 A1    9/1989
DE    39 39 651 C1    5/1991
(Continued)

OTHER PUBLICATIONS

German Office Action Corresponding to DE 10 2010 021 894.4.
(Continued)

*Primary Examiner* — William E Dondero
*Assistant Examiner* — Minh Truong
(74) *Attorney, Agent, or Firm* — Davis & Bujold, P.L.L.C.; Michael J. Bujold

(57) ABSTRACT

A method for the internal oiling of a transmission shaft (1) which is positioned coaxially with the oil pump (2) of a transmission (13) and drives the oil pump (2). The transmission shaft (1) is internally oiled or lubricated using leakage oil which is already present from the oil pump (2) which is integrated in the transmission (13).

15 Claims, 2 Drawing Sheets

(51) Int. Cl.
*F16H 57/04* (2010.01)
*F01M 11/02* (2006.01)
*F01M 1/02* (2006.01)

(56) References Cited

U.S. PATENT DOCUMENTS

| | | | | |
|---|---|---|---|---|
| 3,889,489 | A | * | 6/1975 | Casey et al. .................. 464/16 |
| 4,458,318 | A | * | 7/1984 | Smit et al. ..................... 701/51 |
| 4,494,943 | A | * | 1/1985 | Takei et al. ................... 474/28 |
| 4,624,227 | A | * | 11/1986 | Wunsche ................. 123/198 C |
| 4,669,999 | A | * | 6/1987 | Miller ........................... 464/10 |
| 4,747,808 | A | * | 5/1988 | Moan ............................ 474/28 |
| 4,784,630 | A | * | 11/1988 | Takahashi ..................... 474/28 |
| 4,789,316 | A | * | 12/1988 | Gable ........................... 418/88 |
| 5,152,190 | A | | 10/1992 | Jurgens et al. |
| 5,474,152 | A | * | 12/1995 | Wilkinson et al. ........... 184/6.12 |
| 5,607,371 | A | * | 3/1997 | Yamaguchi ................. 475/210 |
| 6,110,070 | A | * | 8/2000 | Nagai et al. ...................... 476/8 |
| 6,615,966 | B2 | * | 9/2003 | Kato ......................... 192/70.12 |
| 7,516,612 | B2 | | 4/2009 | Schoenek |
| 8,641,394 | B2 | * | 2/2014 | Yamada et al. ............... 418/55.6 |
| 2008/0073153 | A1 | * | 3/2008 | Fujimoto et al. ............. 184/6.28 |
| 2009/0000871 | A1 | * | 1/2009 | McClave et al. .............. 184/6.5 |
| 2010/0193296 | A1 | * | 8/2010 | Sora ................................ 184/14 |
| 2011/0076165 | A1 | * | 3/2011 | Atarashi et al. ............... 417/321 |

FOREIGN PATENT DOCUMENTS

| | | |
|---|---|---|
| DE | 10 2004 018 226 A1 | 12/2005 |
| DE | 10 2005 052 450 A1 | 6/2007 |
| DE | 10 2008 007 848 A1 | 9/2009 |
| EP | 0 985 852 A2 | 3/2000 |
| JP | 7-35222 A | 2/1995 |
| JP | 11-51161 A | 2/1999 |

OTHER PUBLICATIONS

International Search Report Corresponding to PCT/EP2011/055163.
Written Opinion Corresponding to PCT/EP2011/055163.

* cited by examiner

METHOD AND DEVICE FOR THE INTERNAL OILING OF A GEAR SHAFT THAT IS ARRANGED COAXIALLY TO THE OIL PUMP OF A GEARBOX AND DRIVES THE OIL PUMP

This application is a National Stage completion of PCT/EP2011/055163 filed Apr. 4, 2011, which claims priority from German patent application serial no. 10 2010 021 894.4 filed May 28, 2010.

FIELD OF THE INVENTION

The present invention relates to a method for the internal oiling of a transmission shaft which is positioned coaxially with the oil pump of a transmission and drives the oil pump. In addition the invention relates to an arrangement for the internal oiling of a transmission shaft which is positioned coaxially with the oil pump of a transmission and drives the oil pump, in particular for implementing the method according to the invention.

BACKGROUND OF THE INVENTION

From the prior art, various methods and arrangements are known for the internal oiling of transmission shafts. For example, transmission shafts can be internally oiled by passive oiling systems in which special oil and guide devices are used, which collect the oil by means of drip edges in the housing or oil capturing devices and deliver it through ducts to one end of the transmission shaft to be oiled; the oil is led into the transmission shaft to be oiled by means of an oil guide that projects into the shaft at one end or by means of a rotary distributor.

DE 10 2005 052 450 A1 by the present applicant describes a method for oiling components by means of rotating shafts, for example in automatic transmissions of motor vehicles or other mechanisms that have rotating components.

The known system comprises at least two hollow shafts arranged in the flow direction of the oil, such that a main shaft is arranged coaxially in an accommodating area of a driveshaft wherein it is mounted by means of a roller bearing. To be able to supply sufficient lubrication oil to lubrication points at varying oil delivery efficiencies and rotational speeds of the shafts, according to DE 10 2005 052 450 A1 it is provided that on the driveshaft there is arranged an oil reservoir container provided with at least one flexible wall, whose inside space is connected by way of at least one radial bore to the axial bore of the driveshaft, and which has an oil penetration regulating component arranged in the end of the driveshaft remote from the main shaft.

Disadvantageously, in systems of this type additional components are needed, for example oil guide devices and sometimes a rotary distributor, and this has an adverse effect on the assembly effort and on the production and maintenance costs.

Furthermore, the internal oiling of the transmission shafts can be ensured by active oiling systems. In this case the oil is pumped by a pump through an oil guidance system to an injection nozzle at the end of the transmission shaft to be oiled or to a rotary distributor, and injected into the shaft. In active oiling systems as well, additional components are disadvantageously required, such as oil guide devices, an injection nozzle and a rotary distributor.

For example, DE 10 2004 018 226 A1 by the present applicant describes a system for supplying oil to shafts, in particular transmission shafts, that comprises an axially extending bore or oil duct with at least one oil bore in the shaft provided with the axial bore or oil duct, the bore leading from the surface of the shaft into the axial bore or oil duct. In addition the known system comprises at least one nozzle arranged outside the shaft, through which oil is injected into the at least one bore, the injection speed of the oil being determined such that the stream reaches at least as far as into the oil duct in the shaft, where it is broken up and distributed in the shaft.

SUMMARY OF THE INVENTION

The purpose of the present invention is to indicate a method for the internal oiling of a transmission shaft which is positioned coaxially with the oil pump of a transmission and drives the oil pump, by implementing which method fewer additional components are needed than with the methods known from the prior art. A further objective of the invention is to indicate an arrangement for the internal oiling of a transmission shaft which is positioned coaxially with the oil pump of a transmission and drives the oil pump, in particular for implementing the method according to the invention, the arrangement having only a small number of additional components and ensuring effective internal oiling.

Accordingly, a method is proposed for the internal oiling of a transmission shaft which is positioned coaxially with the oil pump of the transmission and drives the oil pump, wherein the internal oiling takes place by means of the leakage oil of the oil pump in the transmission.

The oil pump integrated in the transmission is driven by the transmission shaft to be oiled and is arranged coaxially with it, preferably fixed onto the clutch bell. According to the invention, the leakage oil from at least one pump shaft bearing point is directed into the pump shaft made as a hollow shaft.

If the oiling of the pump shaft bearing points is inadequate, it can be improved by suitable measures. For that purpose, according to the invention the bearing points of the pump shaft can each be connected by a respective groove in the pump housing or in the pump cover to the pressure side of the pump.

The oil passes into the transmission shaft to be oiled by a carrier element which has an internal bore and which connects the pump shaft by friction force to the transmission shaft to be oiled. In the event that the quantity of leakage oil is not sufficient for the internal oiling of the transmission shaft to be oiled, according to a further development of the invention the quantity of leakage oil is selectively increased by suitable means at least at one pump shaft bearing point.

For example, when the pump shaft mounting is in the form of a slide bearing the quantity of leakage oil can be increased by providing an axial groove in at least one pump shaft bearing point in the pump housing. Advantageously, the leakage oil of a further bearing point of the pump shaft and leakage oil flow losses occurring between the pump shaft and the carrier element can be utilized by suitable measures to oil further components of the transmission, for example bearings.

According to the invention, the arrangement for the internal oiling of a transmission shaft positioned coaxially with an oil pump of a transmission and driving the oil pump comprises a means by which the leakage oil from at least one pump shaft bearing point is passed on to the transmission shaft to be oiled. As already explained, the means provided for passing on the leakage oil to the transmission shaft to be oiled consist, on the one hand, of the pump shaft made according to the invention as a hollow shaft and, on the other hand, of the carrier element having an internal bore; the leakage oil from at least one pump shaft bearing point can be passed into the pump shaft made as a hollow shaft, and can be passed on by way of the internal bore of the carrier element to the transmission shaft to be oiled.

The arrangement for the internal oiling of a transmission shaft optionally comprises a means whereby the quantity of leakage oil from the at least one pump shaft bearing point can selectively be increased, such that when the pump shaft mounting is in the form of a slide bearing the means consist of an axial groove in at least one pump shaft bearing point in the pump housing. The arrangement can be configured in such manner that the leakage oil from a further bearing point of the pump shaft and also leakage oil flow losses occurring between the pump shaft and the carrier element can be used for oiling further components.

To improve the oiling of the pump shaft mounting, the bearing points of the pump shaft can be connected to the pressure side of the oil pump by a radially extending groove in the pump housing or in the pump cover.

Thanks to the concept according to the invention, the oiling of a transmission shaft and of components mounted on the transmission shaft, and of the shaft mounting in the transmission is ensured, by making advantageous use of the leakage oil from the oil pump integrated in the transmission which is in any case present.

Furthermore the components required according to the prior art can be omitted since there is no need for an injection nozzle and oil guide plates, oil guides and rotary distributors for the internal oiling of the transmission shaft, which results in a reduction of assembly effort for the arrangement for internal oiling, and of costs; in contrast to the systems known from the prior art, oiling is no longer effected directly by the oil pump or by a known passive oiling system.

Moreover, thanks to the concept according to the invention all of the delivery power of the oil pump, and hence more oil for the other oiling points of the transmission, remain available. It is also possible to use a smaller oil pump, which increases efficiency.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
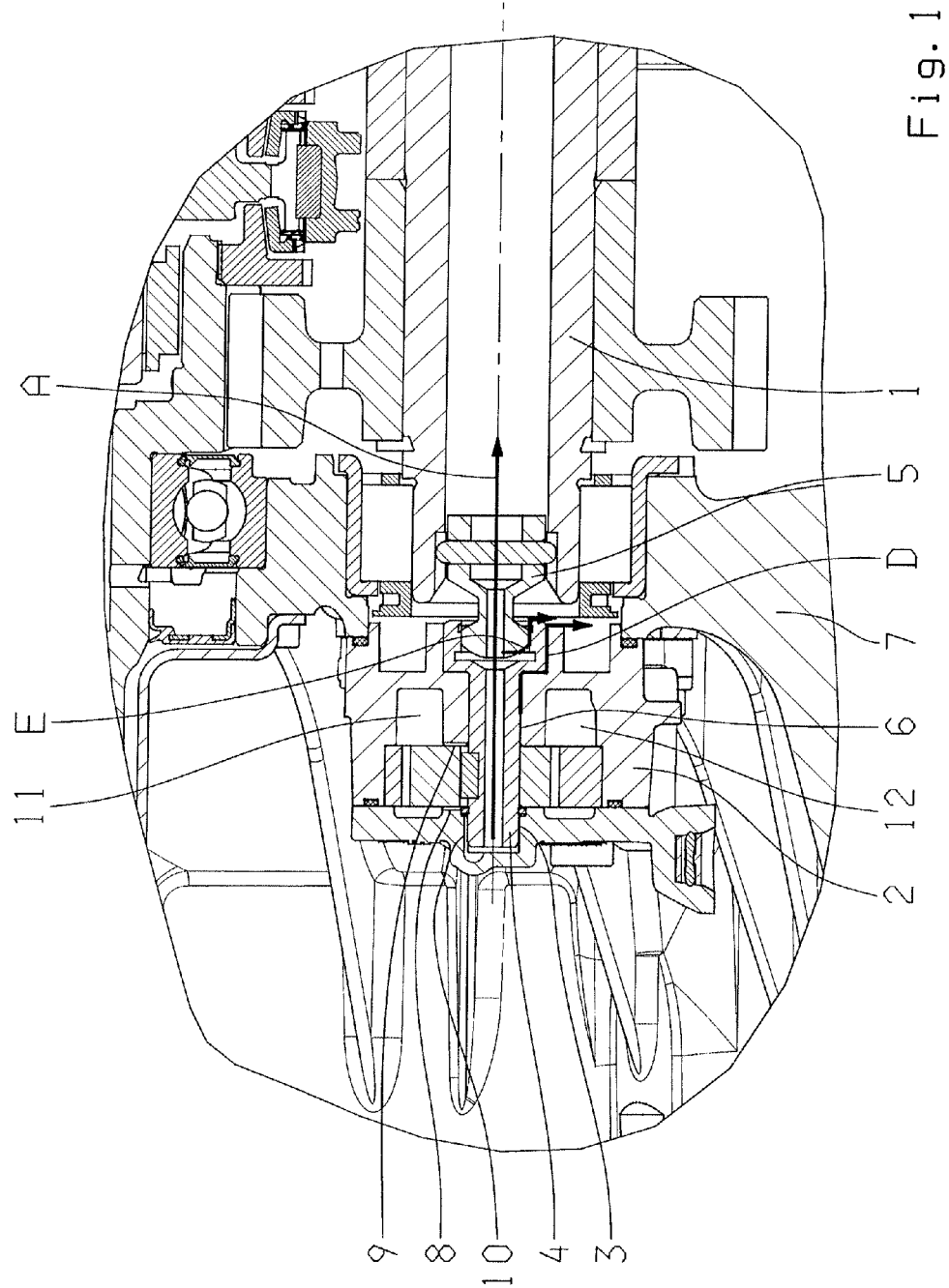
FIG. 1: A sectioned view of part of a transmission, to show the components of an arrangement according to the invention for the internal oiling of a transmission shaft.

According to the invention, the internal oiling of a transmission shaft is effected using the already present leakage oil of the oil pump integrated in the transmission. Referring to FIG. 1, the oil pump 2 attached to the clutch bell 7 is arranged coaxially with the transmission shaft 1 to be oiled, and is driven by the shaft.

According to the invention the leakage oil from at least one pump-shaft bearing point 3 is passed into the pump shaft 4 made as a hollow shaft, and passed on by way of a carrier element 5 with an internal bore that connects the pump shaft 4 to the transmission shaft 1 to be oiled, to the transmission shaft 1 to be oiled which also has an internal bore. The flow of leakage oil for the internal oiling of the transmission shaft 1 is indicated in FIG. 1 by the arrow A.

In the event that the leakage oil from the at least one pump-shaft bearing point 3 is not sufficient for the internal oiling of the transmission shaft 1 to be oiled, it is increased selectively by appropriate measures at least at one bearing point of the pump shaft.

In the example shown in FIG. 1, the pump-shaft mounting is in the form of a slide bearing; according to the invention, in this case the quantity of leakage oil can be increased by forming an axial groove (supplementing means) 10 in a first pump-shaft bearing point 3 in the pump housing.

Advantageously, the leakage oil from a second bearing point 6 of the pump shaft 4, indicated by an arrow D, and leakage oil flow losses occurring between the pump shaft 4 and the carrier element 5, indicated by an arrow E, can be used for oiling further components of the transmission.

Furthermore, it can be provided that the oiling of the pump-shaft mounting is improved by connecting the bearing points 3, 6 of the pump shaft 4 in each case by a respective radially extending groove 8, 9 in the pump housing or in the pump cover, to the pressure side 11 of the oil pump 2. In FIG. 1 the suction side of the oil pump 2 is indexed 12.

Figure 2:
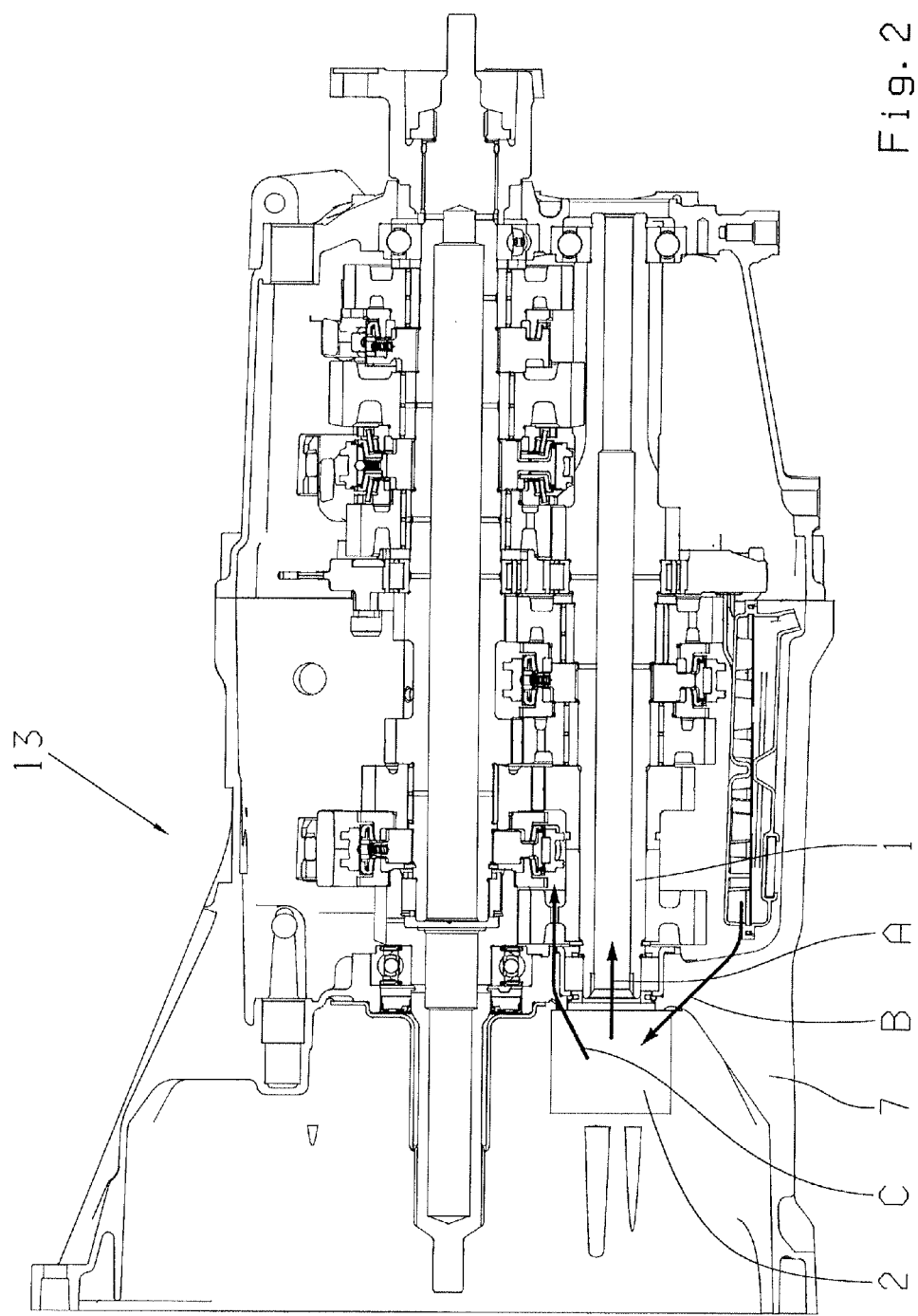
FIG. 2: An overall view of a transmission comprising an arrangement according to the invention for the internal oiling of a transmission shaft.

The object of FIG. 2 is an overall view of a transmission 13, in which an arrangement according to the invention for the internal oiling of a transmission shaft 1 is integrated. In this case the leakage oil flow for internal oiling of the transmission shaft 1 is indicated by the arrow A, the inlet oil flow by the arrow B and the pressure oil flow to the oiling points of the transmission by the arrow C.

INDEXES

1 Transmission shaft
2 Oil pump
3 Pump shaft bearing point
4 Pump shaft
5 Carrier element
6 Pump shaft bearing point
7 Clutch bell
8 Groove
9 Groove
10 Groove
11 Pressure side of the oil pump 2
12 Suction side of the oil pump 2
13 Transmission
A Leakage oil flow for the internal oiling of the transmission shaft 1
B Oil suction flow
C Pressure oil flow
D Leakage oil of the second bearing point 6
E Leakage oil flow losses between the pump shaft 4 and the carrier element 5

The invention claimed is:

1. An arrangement of a hollow transmission shaft (1) in a transmission (13), the hollow transmission shaft (1) being positioned coaxially with an oil pump (2) of the transmission (13), the oil pump (2) having an inlet oil flow (B), an outlet oil flow (C) and at least one leakage oil flow (A, D, E), the hollow transmission shaft (1) driving the oil pump (2) for supplying oil from a pressure side to the transmission (13) via the outlet oil flow (C), and the hollow transmission shaft (1) supporting at least one external gear, wherein the arrangement comprises:

an internal bore of a hollow pump shaft (4) of the oil pump (2) is arranged coaxially with an internal bore of the hollow transmission shaft (1), but the hollow pump shaft (4) is axially spaced from the hollow transmission shaft (1) via a carrier element (5) having an internal bore, a cover of the oil pump (2) sealingly covering an inlet end of the hollow pump shaft (4), a first passage by which the internal bore of the hollow transmission shaft (1) is internally oiled by a first portion (A) of the at least one leakage oil flow which leaks from the oil pump (2), through at least one pump-shaft bearing point (3), between the cover of the oil pump (2) and the inlet end of the hollow pump shaft (4), into the inlet end of the hollow pump shaft (4), along the internal bore of the hollow pump shaft (4), and into the internal bore of the hollow transmission shaft (1), and a second passage by which a second portion (E) of the at least one leakage oil flow which leaks from the oil pump (2), through the at least one pump-shaft bearing point (3), between the inlet end of the hollow pump shaft (4) and the cover of the oil pump (2), into the inlet end and of the hollow pump shaft (4), along the internal bore of the hollow pump shaft (4), between the pump shaft (4) and the carrier element (5), and along an exterior surface of the hollow pump shaft (4).

2. The arrangement for the internal oiling of the hollow transmission shaft (1) according to claim 1, wherein the first passage, for passing on the first portion (A) of the at least one leakage oil to the hollow transmission shaft (1) to be oiled, comprises the internal bore of the carrier element (5) that connects the hollow pump shaft (4) to the hollow transmission shaft (1) to be oiled, such that the first portion (A) of the at least one leakage oil flows through the at least one pump-shaft bearing point (3), into the inlet end of the hollow pump shaft (4) and is passed on, byway of the internal bore of the carrier element (5), into the internal bore of the hollow transmission shaft (1) to be oiled.

3. The arrangement for the internal oiling of the hollow transmission shaft (1) according to claim 1, wherein a supplementing means (10) is provided by which a quantity of leakage oil, supplied to the at least one pump-shaft bearing point (3), is selectively increased.

4. The arrangement for the internal oiling of the hollow transmission shaft (1) according to claim 3, wherein the at least one pump-shaft bearing point is in a form of a slide bearing, and the supplementing means comprises an axial groove (10) in the at least one pump-shaft bearing point (3) of a housing of the pump.

5. The arrangement for the internal oiling of the hollow transmission shaft (1) according to claim 1, wherein a third portion (D) of the at least one leakage oil flows from a further mounting point (6) of the hollow pump shaft (4) and the second portion (E) of the leakage oil flow, between the hollow pump shaft (4) and the carrier element (5), are used for offing at least one further component of the transmission (13).

6. The arrangement for the internal oiling of the hollow transmission shaft (1) according to claim 1, wherein the at least one pump-shaft bearing point (3, 6) of the hollow pump shaft (4) is connected by at least one radially extending groove (8, 9), in either a housing of the pump or in the cover of the pump, to a pressure side (11) of the oil pump (2) for improving the oiling of the at least one pump-shaft bearing point (3, 6).

7. A method of internal oiling of a hollow transmission shaft (1) which is positioned coaxially with a hollow pump shaft (4) of an oil pump (2) of a transmission (13), the oil pump (2) having an inlet oil flow (B), a pressure outlet oil flow (C) and at least one leakage oil flow (A, D, E), and the hollow transmission shaft (1) driving the hollow pump shaft of the oil pump (2), the method comprising the steps of:

arranging the hollow pump shaft (4) coaxially with the hollow transmission shaft (1) while axially spacing the hollow pump shaft (4) from the hollow transmission shaft (1);

coupling the hollow pump shaft (4) to the hollow transmission shaft (1) via a carrier element (5) having an internal bore;

covering an inlet end of the hollow pump shaft (4) with a cover of the pump;

internally oiling the hollow transmission shaft (1) by:

permitting a first portion (A) of the at least one leakage oil to flow through at least one pump-shaft bearing point (3), between the inlet end and the cover of the pump, into the inlet end of the hollow pump shaft (4), internally along the hollow pump shaft (4), through the internal bore of the carrier element (5), and into the hollow transmission shaft (1); and permitting a second portion (E) of the at least one leakage oil to leak between the carrier element (5) and the hollow pump shaft (4) and between the hollow pump shaft (4) and the hollow transmission shaft (1).

8. The method for the internal oiling of the hollow transmission shaft (1) according to claim 7, further comprising the step of selectively increasing a quantity of the first portion (A) of the at least one leakage oil, flowing through the at least one pump-shaft bearing point (3), if the quantity of the first portion (A) of the at least one leakage oil, from the at least one pump-shaft bearing point (3), is not sufficient for the internal oiling of the hollow transmission shaft (1) to be oiled.

9. The method for the internal oiling of the hollow transmission shaft (1) according to claim 8, wherein the at least one pump-shaft bearing point is a slide bearing, and the method further comprising the step of increasing the quantity of the first portion (A) of the at least one leakage oil by forming an axial groove (10) in the at least one pump-shaft bearing point (3).

10. The method for the internal oiling of the hollow transmission shaft (1) according to claim 7, further comprising the step of directing a third portion (D) of the at least one leakage oil, from a further bearing point (6) of the hollow pump shaft (4), and the second portion (E) of the at least one leakage oil flow, from between the hollow pump shaft (4) and the carrier element (5), for oiling at least one further component of the transmission (13).

11. The method for the internal oiling of the hollow transmission shaft (1) according to claim 7, further comprising the step of connecting the at least one pump-shaft bearing point (3, 6) of the hollow pump shaft (4) by at least one radially extending groove (8, 9), in either a housing of the pump or a cover of the pump, to a pressure side (11) of the oil pump (2) for improving oiling of the at least one pump-shaft bearing point.

12. The method for the internal oiling of the hollow transmission shaft (1) according to claim 7, further comprising the step of arranging a clutch bell (7) coaxially with the transmission shaft (1) to be oiled, and attaching the oil pump (2) to the clutch bell (7).

13. The method for the internal oiling of the hollow transmission shaft (1) according to claim 7, further comprising the step of supplying the at least one leakage oil flow (A, D, E) from the pump and into the end of the hollow pump shaft (4) via both at least one axial groove and at least one radial groove.

14. A method of internal oiling of a hollow transmission shaft (1) which is positioned coaxially with a hollow pump shaft (4) of single oil pump (2) of an automatic transmission (13), the oil pump (2) having an inlet oil flow (B), a pressure outlet oil flow (C) and at least one leakage oil flow (A, D, E), and the hollow transmission shaft (1) driving the hollow pump shaft of the oil pump (2) for supplying oil from a pressure side to the transmission, the method comprising the steps of:

- arranging the hollow pump shaft (4) coaxially with the hollow transmission shaft (1) while axially spacing the hollow pump shaft (4) from the hollow transmission shaft (1);
- covering an inlet end of the hollow pump shaft (4) with a cover of the pump;
- supplying oil to the transmission via the pressure outlet oil flow; and
- internally oiling the hollow transmission shaft (1) by permitting a first portion (A) of the at least one leakage oil to flow through at least one pump-shaft bearing point (3), between the inlet end and the cover of the pump, into the inlet end of the hollow pump shaft (4), internally along the hollow pump shaft (4), and into the hollow transmission shaft (1).

15. The method for the internal oiling of the hollow transmission shaft (1) according to claim 14, further comprising the steps of:

- oiling an exterior of the hollow pump shaft (4) by permitting a second portion (D) of the at least one leakage oil to flow axially through a second pump-shaft bearing point (6) of the hollow pump shaft (4); and
- oiling components mounted on the hollow transmission shaft (1) by permitting a third portion (E) of the at least one leakage oil to flow through the at least one pump-shaft bearing point (3) and into and along the hollow pump shaft (4), and radially past a connection between the hollow pump shaft (4) and the carrier element (5) to the components mounted on the hollow transmission shaft (1).

\* \* \* \* \*